United States Patent
Keller et al.

(10) Patent No.: US 9,041,721 B2
(45) Date of Patent: May 26, 2015

(54) SYSTEM, METHOD, AND COMPUTER PROGRAM PRODUCT FOR EVALUATING AN INTEGRAL UTILIZING A LOW DISCREPANCY SEQUENCE AND A BLOCK SIZE

(75) Inventors: Alexander Keller, Berlin (DE); Nikolaus Binder, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 87 days.

(21) Appl. No.: 13/598,511

(22) Filed: Aug. 29, 2012

(65) Prior Publication Data
US 2013/0207978 A1 Aug. 15, 2013

Related U.S. Application Data

(60) Provisional application No. 61/598,278, filed on Feb. 13, 2012.

(51) Int. Cl.
*G06T 15/06* (2011.01)
*G06T 15/50* (2011.01)

(52) U.S. Cl.
CPC ................ *G06T 15/06* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 6,795,584 B2 * | 9/2004 | Karczewicz et al. | 382/239 |
| 7,236,521 B2 * | 6/2007 | Schoenblum | 375/240.03 |
| 7,831,088 B2 * | 11/2010 | Frakes et al. | 382/154 |
| 8,266,623 B2 | 9/2012 | Keller et al. | |
| 2007/0018978 A1 * | 1/2007 | Herken et al. | 345/426 |
| 2010/0281480 A1 | 11/2010 | Keller et al. | |
| 2011/0268179 A1 * | 11/2011 | Diggins et al. | 375/240.02 |
| 2014/0122548 A1 | 5/2014 | Keller | |

OTHER PUBLICATIONS

Faure, H., "Discrepance de suites associees a un systeme de numeration (en dimension s)," Acta Arithmetica, vol. 41, No. 4, 1982, pp. 337-351.
Grunschloss, L. et al., "Enumerating Quasi-Monte Carlo Point Sequences in Elementary Intervals," Monte Carlo and Quasi-Monte Carlo Methods, 2010, pp. 1-10.
Hickernell, F. et al., "Extensible Lattice Sequences for Quasi-Monte Carlo Quadrature," SIAM Journal on Scientific Computing, 2001, pp. 1-22.
Hachisuka, T. et al., "Stochastic Progressive Photon Mapping," ACM SIGGRAPH Asia 2009 papers, 2009, pp. 1-8.
Hachisuka, T. et al., "Progressive Photon Mapping," ACM Transactions on Graphics, Proceedings of ACM SIGGRAPH Asia 2008, vol. 27, Issue 5, Dec. 2008, pp. 1-8.
Jensen, H. et al., "A Practical Model for Subsurface Light Transport," SIGGRAPH '01 Proceedings of the 28th annual conference on Computer Graphics and Interactive Techniques, 2001, pp. 1-8.
Jensen, H., "Realistic Image Synthesis Using Photon Mapping," AK Peters, 2001, pp. 1-181.

(Continued)

*Primary Examiner* — Said Broome
(74) *Attorney, Agent, or Firm* — Zilka-Kotab, PC

(57) ABSTRACT

A system, method, and computer program product are provided for evaluating an integral utilizing a low discrepancy sequence and a block size. In use, a low discrepancy sequence and a block size are determined. Additionally, an integral is evaluated, utilizing the low discrepancy sequence and the block size.

17 Claims, 8 Drawing Sheets

(56) References Cited

OTHER PUBLICATIONS

Jarosz, W. et al., "Progressive Photon Beams," In ACM Transactions on Graphics (Proceedings of ACM SIGGRAPH Asia 2011), Dec. 2011, pp. 1-11.

Keller, A., "Instant Radiosity," SIGGRAPH 1997: Proceedings of the 24th Annual Conference on Computer Graphics and Interactive Techniques, 1997, pp. 1-8.

Keller, A., "Myths of Computer Graphics," In H. Niederreiter editor, Monte Carlo and Quasi-Monte Carlo Methods 2004, Springer 2006, pp. 217-243.

Keller, A. et al., "Quasi-Monte Carlo Progressive Photon Mapping," Technical report, mental images, GmbH, 2010, pp. 1-11.

Keller, A. et al., "Interleaved Sampling," Rendering Techniques 2001 (Proc. 12th Eurographics Workshop on Rendering), Springer, 2001, pp. 269-276.

Kollig, T. et al., "Efficient Bidirectional Path Tracing by Randomized Quasi-Monte Carlo Integration," In H. Niederreiter, K. Fang, and F. Hickernell, editors, Monte Carlo and Quasi-Monte Carlo Methods 2000, Springer, 2002, pp. 1-16.

Knaus, C. et al., "Progressive Photon Mapping: A Probabilistic Approach," ACM Transactions on Graphics (TOG), vol. 30, No. 3, May 2011, pp. 1-14.

Niederreiter, H., "Point Sets and Sequences with Small Discrepancy," Montash. Math., vol. 104, 1987, pp. 273-337.

Niederreiter, H., "Error Bounds for Quasi-Monte Carlo Integration with Uniform Point Sets," Journal of Computational and Applied Mathematics, vol. 150, 2003, pp. 283-292.

Niederreiter, H., "Random Number Generation and Quasi-Monte Carlo Methods," Society for Industrial and Applied Mathematics, 1992, pp. 1-241.

Owen, A., "Randomly Permuted (t,m,s)-Nets and (t, s)-Sequences," Technical Report No. 464, 1994, pp. 1-18.

Pajot, A. et al., "Combinatorial Bidirectional Path-Tracing for Efficient Hybrid CPU/GPU Rendering," Eurographics, vol. 30, No. 2, Apr. 2011, pp. 315-324.

Silverman, B., "Density Estimation for Statistics and Data Analysis," Monographs on Statistics and Applied Probability, Chapman and Hall, 1986, pp. 1-22.

Sobol, I., "On the Distribution of Points in a Cube and the Approximate Evaluation of Integrals," Zh. vychisl. Mat. mat. Fiz., vol. 7, No. 4, 1967, pp. 784-802.

Veach, E., "Robust Monte Carlo Methods for Light Transport Simulation," Ph.D. thesis, Stanford University, Dec. 1997, pp. 1-406.

Wozniakowski, H., "Average Case Complexity of Multivariate Integration," Bulletin of the American Mathematical Society, vol. 24, No. 1, Jan. 1991, pp. 185-194.

Bratley, P. et al., "Implementation and Tests of Low-Discrepancy Sequences," ACM Transactions on Modeling and Computer Simulation, vol. 2, No. 3, 1992, pp. 195-213 (Abstract).

Halton, J., "On the Efficiency of Certain Quasi-Random Sequences of Points in Evaluating Multi-Dimensional Integrals," Numerische Math., vol. 2, 1960, pp. 84-90.

Owen, A., "Monte Carlo Variance of Scrambled Net Quadrature" SIAM Journal on Numerical Analysis, vol. 34, No. 5, 1997, pp. 1884-1910 (Abstract).

Shirley, P., "Realistic Ray Tracing," AK Peters, Ltd., 2000, pp. 1-165.

Bratley, P. et al., "Implementation and Tests of Low-Discrepancy Sequences," ACM Transactions on Modeling and Computer Simulation, vol. 2, No. 3, Jul. 1992, pp. 195-213.

Owen, A., "Monte Carlo Variance of Scrambled Net Quadrature," SIAM Journal on Numerical Analysis, vol. 34, No. 5, Oct. 1997, pp. 1884-1910.

Schmid, W., "(t,m,s)-Nets: Digital Construction and Combinatorial Aspects," Ph.D. thesis, Universitat Salzburg, May 1995, pp. 1-59.

\* cited by examiner

SYSTEM, METHOD, AND COMPUTER PROGRAM PRODUCT FOR EVALUATING AN INTEGRAL UTILIZING A LOW DISCREPANCY SEQUENCE AND A BLOCK SIZE

CLAIM OF PRIORITY

This application claims the benefit of U.S. Provisional Patent Application No. 61/598,278, filed Feb. 13, 2012, the entire contents of which are incorporated herein by reference.

FIELD OF THE INVENTION

The present invention relates to rendering images, and more particularly to performing light transport simulation.

BACKGROUND

Traditionally, light transport simulation has been used to enhance a visual realism of generated images. For example, light transport simulation may be used to generate realistic images by tracing paths of light through the pixels of the image plane. However, current techniques for performing light transport simulation have been associated with various limitations.

For example, current methods for performing light transport simulation may be inefficient, and may require a tensor product approach in order to maintain consistency. This may include deterministic approaches. There is thus a need for addressing these and/or other issues associated with the prior art.

SUMMARY

A system, method, and computer program product are provided for evaluating an integral utilizing a low discrepancy sequence and a block size. In use, a low discrepancy sequence and a block size are determined. Additionally, an integral is evaluated, utilizing the low discrepancy sequence and the block size.

DETAILED DESCRIPTION

Figure 1:
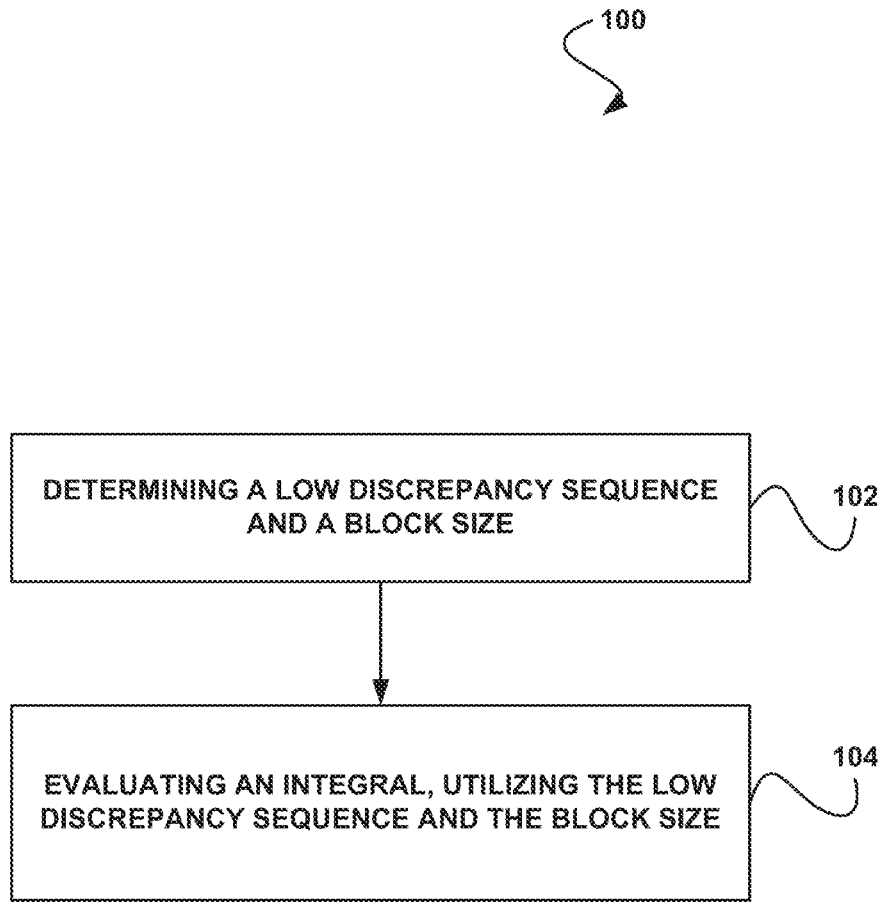
FIG. 1 shows a method for evaluating an integral utilizing, a low discrepancy sequence and a block size, in accordance with one embodiment.

FIG. 1 shows a method 100 for evaluating an integral utilizing a low discrepancy sequence and a block size, in accordance with one embodiment. As shown in operation 102, a low discrepancy sequence and a block size are determined. In one embodiment, the low discrepancy sequence may include a plurality of vectors. For example, the low discrepancy sequence may include a sequence of vectors with a low discrepancy. In another embodiment, the low discrepancy sequence may include a sequence $(x_i, y_i)$, where $x_i$ represents dimensions of a sink path segment, and $y_i$ represents dimensions of a source path segment.

Additionally, in one embodiment, the low discrepancy sequence may include a (t,s)-sequence in base b. In another embodiment, the low discrepancy sequence may include a rank-1 lattice sequence. In yet another embodiment, the low discrepancy sequence may include a Halton sequence. Of course, however, the low discrepancy sequence may include any sequence of vectors with a low discrepancy.

Further, in one embodiment, the block may include a designated unit of storage. For example, one or more vectors may be stored within the block. In another embodiment, the block size may include a predetermined number of values within a block of values. For example, the block size may include a predetermined number of vectors to be contained within a block of vectors.

Further still, as shown in operation 104, an integral is evaluated, utilizing the low discrepancy sequence and the block size. In one embodiment, the integral may be progressively evaluated, utilizing the low discrepancy sequence and the block size. In another embodiment, evaluating the integral may include partitioning the low discrepancy sequence into contiguous blocks of vectors. For example, the low discrepancy sequence may be segmented into contiguous blocks of vectors, where each block has a size equal to the block size, in another embodiment, the integral may include an integral of a measurement contribution function $f(x,y)$. In yet another embodiment, the integral may include an integral of a measurement contribution function $f(x_i, y_i)$, where the measurement contribution function is evaluated for all possible sequence pairs $(x_i, y_i)$ within each block.

Also, in one embodiment, evaluating the integral may include utilizing the integral as a consistent blockwise quasi-Monte Carlo method to generate one or more paths by connecting path segments for light transport simulation. For example, the low discrepancy sequence may include a sequence $(x_i, y_i)$, where the x value represents dimensions of an optical path segment (e.g., a path segment originating from a camera, an eye, etc). Additionally, the y value may represent dimensions of a light source path segment. In another embodiment, the measurement contribution function $f(x,y)$ may determine a contribution resulting from the connection of the optical path segment and the light source path segment. For example, the measurement contribution function $f(x,y)$ may determine a light transport measurement along a light transport path. In this way, the integrand may be used to generate paths by connecting path segments.

In addition, in one embodiment, evaluating the integral may include determining a measurement contribution resulting from a connection of one or more optical path segments and one or more tight source path segments. For example, end points may be determined for each tuple, $(x_i, y_i)$, where the end point for $x_i$ may be determined by tracing an optical path from its origin (e.g., a camera, an eye, etc.), and where the end point for $y_i$ may be determined by tracing a photon trajectory from a light source.

Furthermore, in one embodiment, the determined end points may be connected based on one or more criteria. In one embodiment, the end points may be connected utilizing a kernel function. For example, the end points may be connected utilizing a kernel function including one or more of a shadow ray test, a connection by proximity, a bidirectional surface scattering reflectance distribution function, etc. In another embodiment, participating media may be considered while generating and connecting the path segments.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
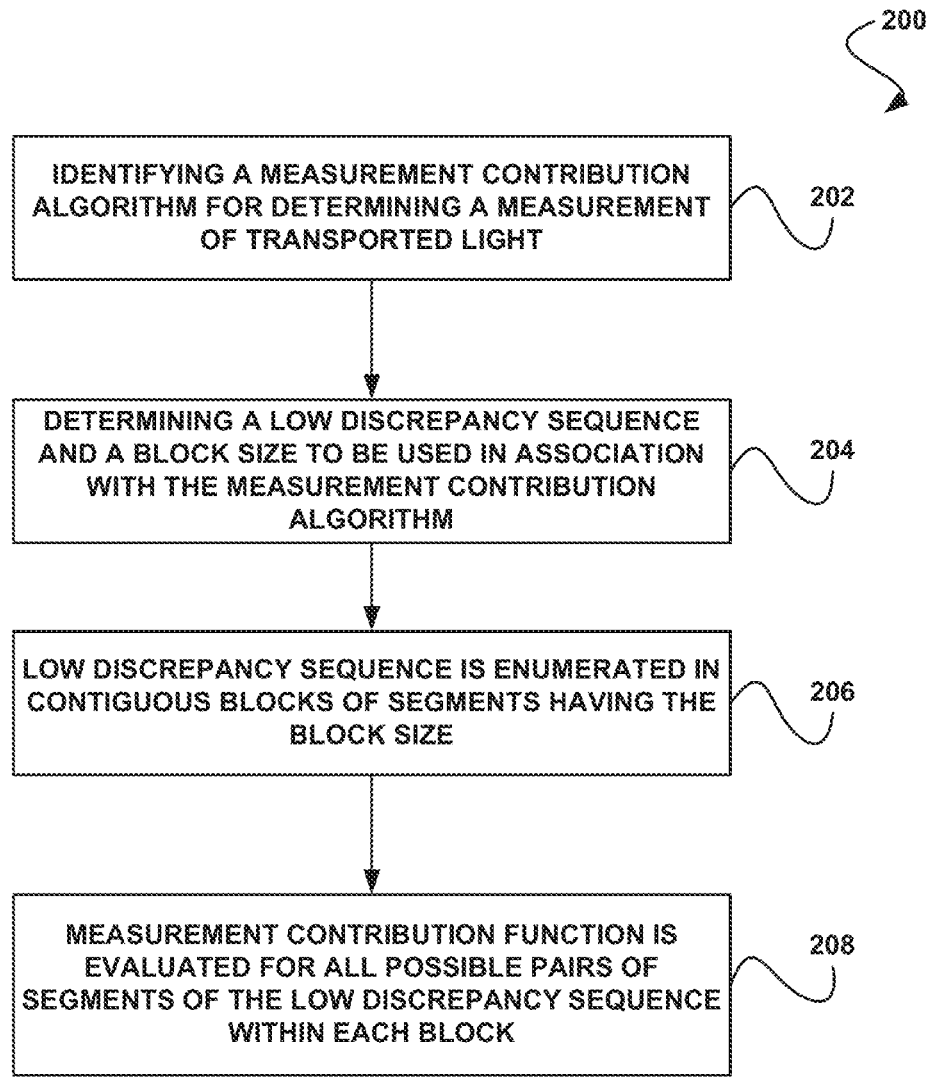
FIG. 2 shows a method for performing light transport simulation during image synthesis, in accordance with another embodiment.

FIG. 2 shows a method 200 for performing tight transport simulation during image synthesis, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a measurement contribution algorithm for determining a measurement of transported light is identified. In one embodiment, image synthesis may include computing functionals of the solution of a Fredholm integral equation of the second kind, which models light transport. Due to high dimensionality and discontinuities of the functions involved, numerical algorithms may average the contribution of transport paths sampled from the space of all possible light transport paths.

Additionally, Monte Carlo methods may generate such samples from random numbers, which on a computer are simulated by pseudo-random number generators. See, for example, "Die Monte-Carlo-Methode," Sobol, Deutscher Verlag der Wissenschaften, 1991), which is hereby incorporated by reference in its entirety. Independence and unpredictability may only be mimicked, because pseudorandom number generators may be implemented as deterministic algorithms.

Further, quasi-Monte Carlo methods may include the deterministic counterpart of Monte Carlo methods. See, for example, "Random Number Generation and Quasi-Monte Carlo Methods," (H. Niederreiter, SIAM, Philadelphia, 1992, 1, 2.1, 1, 2.1, 2.3), which is hereby incorporated by reference in its entirety. They may improve convergence speed as compared to Monte Carlo methods, because omitting the simulation of independence and unpredictability may allow for improved sampling. In addition, quasi-Monte Carlo methods may have the desirable properties of simple parallelization and strict reproducibility. See, for example, "Parallel quasi-Monte Carlo methods," (A. Keller and L. Grünschloβ, *Monte Carlo and Quasi-Monte Carlo Methods* 2010, 2011, pages 467-478), and "Enumerating quasi-Monte Carlo point sequences in elementary intervals," (Grünschloβ et al., *Monte Carlo and Quasi-Monte Carlo Methods* 2010, 2012, 1992, pages 379-388), which are hereby incorporated by reference in their entirety.

Further still, in image synthesis, the aforementioned functionals may correspond to measurements of transported light and may be formulated as integrals of a measurement contribution function $f(x,y)$, which may determine the transport along a light transport path that is determined by x and y. Such paths may result from connecting a path segment from a sink determined by x to a path segment originating from a source as determined by y.

Also, it may be efficient to connect multiple paths from a source to one from the sink and vice versa. For this setting, anew quasi-Monte Carlo algorithm may be derived and applied to image synthesis as shown herein below. This algorithm may be useful in difficult settings of light transport and may improve the efficiency of an approach to consistent deterministic light transport simulation by overcoming the necessity of a tensor product approach in order to guarantee consistency. See, for example, "Quasi-Monte Carlo progressive photon mapping," (A. Keller et al, *Monte Carlo and Quasi-Monte Carlo Methods* 2010, 2011, pages 479-489), which is hereby incorporated by reference in its entirety.

For example, the measurement contribution algorithm may include an integral. Table 1 illustrates an exemplary measurement contribution algorithm. Of course, it should be noted that the measurement contribution algorithm shown in Table 1 is set forth for illustrative purposes only, and thus should not be construed as limiting in any manner.

TABLE 1

$$\int_{[0,1]^{s_1}} \int_{[0,1]^{s_2}} f(x, y) \, dy \, dx = \lim_{n \to \infty} \frac{1}{n} \sum_{i=0}^{n-1} \frac{1}{b^m} \sum_{k=0}^{b^m-1} f(x_i, y_{b^m \lfloor i/b^m \rfloor + k})$$

Figure 3:
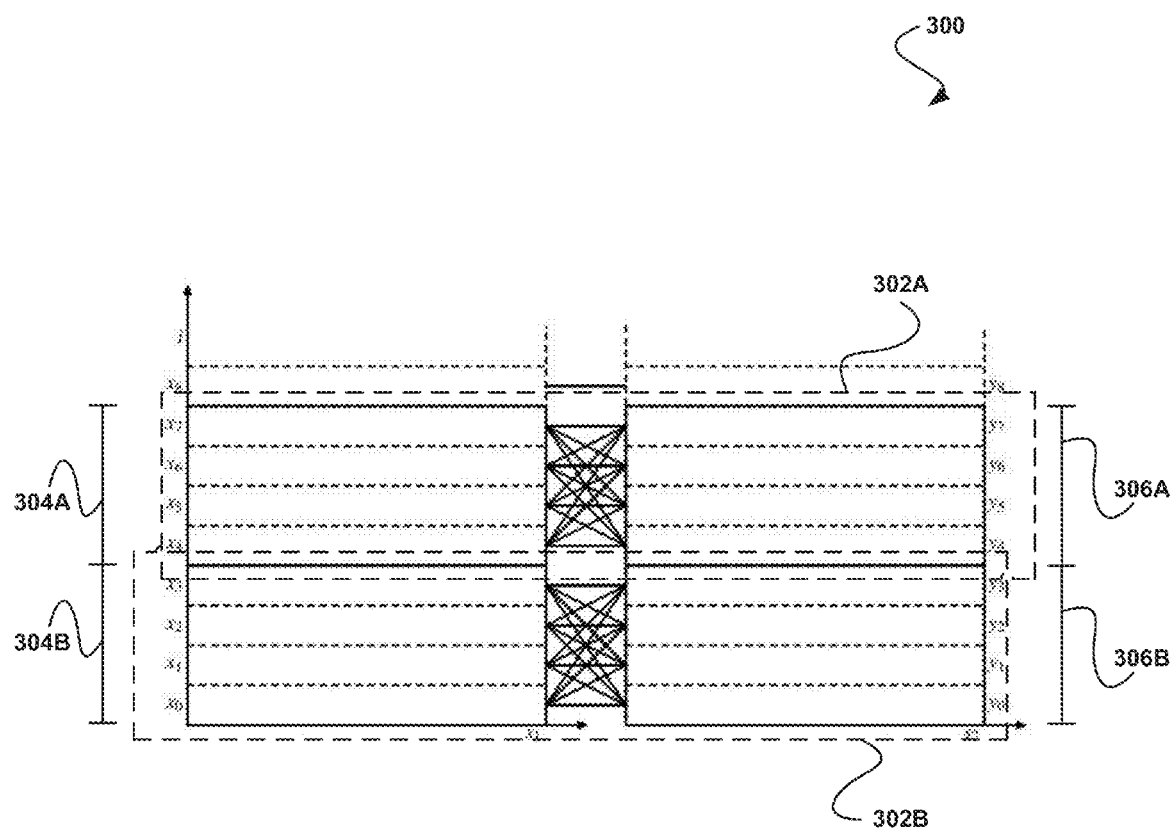
FIG. 3 shows an exemplary $s_1+s_2$-dimensional low discrepancy sequence, in accordance with another embodiment.

Additionally, in one embodiment, in the above measurement contribution algorithm, x may represent the $s_1$ dimensions of a sink path, y may specify a trajectory of a source path in $s_2$ dimensions, and $f(x,y)$ may include a measurement contribution resulting from the connection of both path segments. In another embodiment, the measurement contribution algorithm shown in Table 1 may average measurement contributions. For example, FIG. 3 shows an exemplary $s_1+s_2$-dimensional low discrepancy sequence 300 which is partitioned into contiguous blocks 302A-B of $b^m$ vectors. Additionally, all vectors within the low discrepancy sequence 300 are identically partitioned into $s_1$-dimensional $x_i$ components 304A-B and $s_2$-dimensional $y_i$ components 306A-B.

Further, in one embodiment, the measurement contribution algorithm shown in Table 1 may average the measurement contributions of contiguous blocks of $b^m$ vectors $(x_i, y_i)$, where within each block with integer index $[i/b^m]$ each $x_i$ is combined with all $y_{b^m \lfloor i/b \rfloor + k}^m$ for $0 \le k < b^m$. In another embodiment, instead of infinite computation as suggested by the "lim"s, the computation may progress in contiguous blocks, which may allow an increase in efficiency by storing intermediate results of the path segments that are accessed $b^m$ times in $O(b^m)$ memory.

Further still, in one embodiment, the computation may be stopped and continued by saving the current set of indices. In another embodiment, termination may be triggered by for example the user, by fixing sample or time budget, or thresholding differences during the temporal progression of the algorithm. See, for example, "Termination criteria for linear problems," (S. Paskov, Journal of Complexity, 1995, 11:105-137), which is hereby incorporated by reference in its entirety.

In yet another embodiment, using the fact that quasi-Monte Carlo integration converges for bounded, square integrable functions, the consistency of the above measurement contribution algorithm may be shown for quasi-Monte Carlo points that are based on radical inversion. In yet another embodiment, results of a proof based on the properties of point sequences and a technique called scrambling may be generalized to include quasi-Monte Carlo integro-approximation by adding a free variable z and considering $f(x,y,z)$. Also, see, for example, "Error bounds for quasi-Monte Carlo integration with uniform point sets," (H. Niederreiter, *J. Comput. Appl. Math.*, 2003), and "Myths of computer gsaphics," (A. Keller, *Monte Carlo and Quasi-Monte Carlo Methods* 2004, 2006, pages 217-243), which are hereby incorporated by reference in their entirety.

Also, as shown in operation 204, a low discrepancy sequence and a block size to be used in association with the measurement contribution algorithm are determined. For example, instead of sampling by using uniform random or pseudo-random numbers, quasi-Monte Carlo methods may apply deterministic low discrepancy sequences, which may be more uniformly distributed than random numbers can be.

In addition, in one embodiment, the measurement contribution algorithm may be proofed. For example, in order to proof the measurement contribution algorithm, a framework based on stratification properties may be used. See, for example, "Point sets and sequences with small discrepancy," (H. Niederreiter, *Monatsh. Math*, 1987, 104:273-337), "On the Distribution of points in a cube and the approximate evaluation of integrals," (I. Sobol', *Zh. vychisl. Mat. mat. Fiz.*, 1967, 7(4):784-802), and "Discrépances des suites associées a un systèmic d'enumération (en dimension s)," (H. Faure, *Acta Arith*, 1982, 41(4):337-351), which are hereby incorporated by reference in their entirety.

Furthermore, in one embodiment, the stratification properties may be imposed by a predetermined definition. Table 2 illustrates an exemplary definition for use in proofing a measurement contribution algorithm. Of course, it should be noted that the definition shown in Table 2 is set forth for illustrative purposes only, and thus should not be construed as limiting in any manner.

TABLE 2

For a fixed dimension $s \geq 1$ and an integer base $b \geq 2$ the subinterval $$E(p_1, \ldots, p_s) := \prod_{j=1}^{s} [p_j \cdot b^{-d_j}, (p_j + 1) \cdot b^{-d_j}) \subseteq [0, 1)^s$$

with $0 \leq p_j < b^{d_j}$, $p_j, d_j \in \mathbb{N}_0$, is called an elementary interval.
For integers $0 \leq t \leq m$, a (t, m, s)-net in base b is a point set of $b^m$ points in $[0, 1)^s$ such that there are exactly $b^t$ points in each elementary interval $E(p_1, \ldots, p_s)$ with volume $b^{t-m}$. For an integer $t \geq 0$, a sequence $x_0, x_1, \ldots$ of points in $[0, 1)^s$ is a (t, s)-sequence in base b if, for all integers $k \geq 0$ and $m > t$, the point set $x_{kb^m}, \ldots, x_{(k+1)b^m-1}$ is a (t, m, s)-net in base b.

One construction to enumerate the components of (t, s)-sequences in base b may be to first represent the integer index shown in Table 3 by its digits $a_1(i) \in Z_b := \{0, \ldots, b-1\}$ in base b. Of course, it should be noted that the integer index shown in Table 3 is set forth for illustrative purposes only, and thus should not be construed as limiting in any manner.

TABLE 3

$$i = : \sum_{l=0}^{M-1} a_l(i) \cdot b^l$$

Additionally, the j-th component of the i-th point $U_i$ may be computed as shown in Table 4. Of course, it should be noted that the integer index shown in Table 4 is set forth for illustrative purposes only, and thus should not be construed as limiting in any manner.

TABLE 4

$$U_i^{(j)} = \sum_{k=1}^{M} u_{i,k}^{(j)} \cdot b^{-k} =_b 0.u_{i,1}^{(j)} u_{i,2}^{(j)} \ldots u_{i,M}^{(j)} \in [0, 1) \cap \mathbb{Q}, \text{ where}$$

$$u_{i,k}^{(j)} := \eta_k^{(j)} \left( \sum_{l=0}^{M-1} c_{k,l}^{(j)} \cdot \psi_l(a_l(i)) \right)$$

Further, $\eta_k^{(j)}: R \to Z_b$ and $\psi_l: Z_b \to R$ are two families of bijections from and to a commutative ring $(R, +, \cdot)$ with $|R|=b$ elements. While in theory the generator matrices shown in Table 5 may be infinite-dimensional in practice they may be finite due to the finite precision of computer arithmetic. Also, M digits may allow for generating up to $b^M$ points. Again, it should be noted that generator matrices shown in Table 5 are set forth for illustrative purposes only, and thus should not be construed as limiting in any manner.

TABLE 5

$$C^{(j)} := \left( c_{k,l}^{(j)} \right)_{k=1, l=0}^{M, M-1} \in R^{M \times M}$$

Further still, if the constructed point set $U=\{U_0, \ldots, U_{n-1}\}$ is a (t,m,s)-net in base b, then it may also be called a digital (t,m,s)-net constructed over R. Digital (t,s)-sequences may be defined analogously. The quality of a digital sequence may be determined by the choice of the ring R and the generator matrices $C^{(j)}$. Polynomial rings R[X] over R may be used for the construction of the generator matrices $C^{(j)}$. See, for example, "Implementation and tests of low-discrepancy sequences," (Bratley et al., *ACM Trans. Modeling and Comp. Simulation*, 1992, 2(3):195-213), and "(t,m,s)-Nets: Digital Construction and Combinatorial Aspects," (W. Schmid, Universitat Salzburg PhD thesis, 1995), which are hereby incorporated by reference in their entirety.

Also, one exemplary implementation of digital sequences may include the Sobol' sequence, which may include a (t,s)-sequence in base b=2. The match of bit vector and computer arithmetic may allow for the rapid generation of the Sobol' points at a speed comparable to high quality pseudo-random number generators. See, for example, "Construction and comparison of high-dimensional Sobol' generators," (I. Sobol' et *WILMOIT magazine*, 2011, pages 64-79), which is hereby incorporated by reference in its entirety, and which describes exemplary generator matrices.

Figure 4:
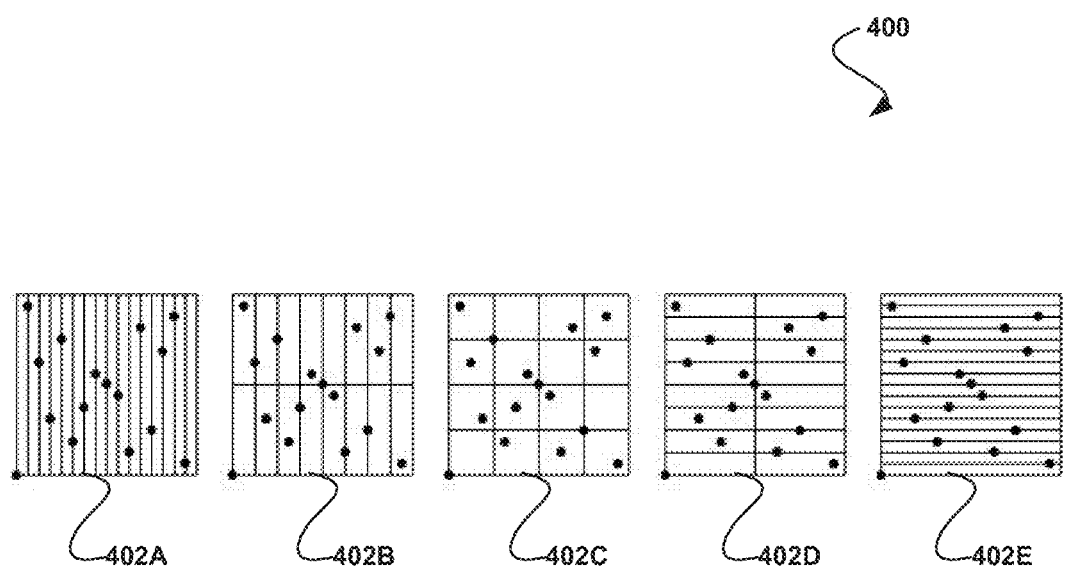
FIG. 4 shows an exemplary structure imposed by elementary intervals, in accordance with another embodiment.

Additionally, an exemplary property of Sobol's constructions is that each component may be a (0,1) sequence. Thus the matrices $C^{(j)}$ may be regular (in fact they may be upper triangular matrices) and the equation shown in Table 4 may be a bijection. An exemplary structure 400 imposed by the elementary intervals is shown in FIG. 4 for the example of a (0,m,2)-net resulting from the first two dimensions of the Sobol' sequence. As shown, the first T=16 points of Sobol's (0,2)-sequence, which form a (0,4,2)-net in base b=2, are superimposed over each set of elementary intervals 402A-E.

Further, in one embodiment, in order to scramble a point set on $H=[0,1)^s$, the following steps shown in Table 6 may be applied to each coordinate. Of course, it should be noted that the steps shown in Table 6 are set forth for illustrative purposes only, and thus should not be construed as limiting in any manner.

TABLE 6

1. Slice H into b equal volumes $H_1, H_2, \ldots, H_b$ along the coordinate.
2. Permute these volumes.
3. For each volume $H_h$ recursively repeat the procedure starting out with $H = H_h$.

Further still, while scrambling has been introduced to randomize point sets in order to allow for variance estimation, in fact, several improvements to low discrepancy sequence may include deterministic scramblings. As the partitioning happens along elementary intervals, the t parameter of (t,s) sequences in base b may be invariant with respect to scrambling. See, for example, "Randomly permuted (t,m,s)-nets and (t,s)-sequences," (A. Owen, *Monte Carlo and Quasi-Monte Carlo Methods in Scientific Computing*, volume 106 of *Lecture Notes in Statistics*, 1995, pages 299-315), and "Monte Carlo variance of scrambled net quadrature," (A. Owen, *SIAM Journal on Numerical Analysis*, 1997, 34(5):1884-1910), which are hereby incorporated by reference in their entirety.

Also, due to the finite precision of computer arithmetic, the scheme may become a finite algorithm that may be formalized as shown in Table 7. Of course, it should be noted that the algorithm shown in Table 7 is set forth for illustrative purposes only, and thus should not be construed as limiting in any manner.

TABLE 7

Given the j-th component
$U_i^{(j)} =_b 0.u_{i,1}^{(j)}u_{i,2}^{(j)}u_{i,3}^{(j)} \ldots u_{i,M}^{(j)}$ of the i-th point of a point sequence, its scrambled version $V_i^{(j)} =_b 0.v_{i,1}^{(j)}v_{i,2}^{(j)}v_{i,3}^{(j)} \ldots v_{i,M}^{(j)}$ is determined by applying permutations to the digits $$v_{i,1}^{(j)} := \pi^{(j)}(u_{i,1}^{(j)})$$

$$v_{i,2}^{(j)} := \pi^{(j)}_{u_{i,1}^{(j)}}(u_{i,2}^{(j)})$$

$$\vdots$$

$$v_{i,M}^{(j)} := \pi^{(j)}_{u_{i,1}^{(j)},u_{i,2}^{(j)},\ldots,u_{i,M-1}^{(j)}}(u_{i,M}^{(j)}),$$

where the k-th permutation from the symmetric group $S_b$ of all permutations over the set $\{0, \ldots, b-1\}$ depends on the $k-1$ leading digits of $U_i^{(j)}$.
The mapping is bijective on $[0,1) \cap \mathbb{Q}$, because the inverse $u_{i,k}^{(j)}$ of any $v_{i,k}^{(j)}$ is found by recursively $$\text{computing } u_{i,k}^{(j)} = \left(\pi^{(j)}_{u_{i,1}^{(j)},\ldots,u_{i,k-1}^{(j)}}\right)^{-1}(v_{i,k}^{(j)}).$$

in addition, with the properties of (t,s)-sequences and scrambling as shown hereinabove, the measurement contribution algorithm may be proofed. Table 8 illustrates an exemplary proof of the measurement contribution algorithm as shown in Table 1. Of course, it should be noted that the proof in Table 8 is set forth for illustrative purposes only, and thus should not be construed as limiting in any manner.

TABLE 8

Theorem

Given a deterministic digital (t, s)-sequence $(x_i, y_i)$ in base b, whose components in $y_i$ are generated by regular upper triangular matrices, $$\int_{[0,1)^{s_1}} \int_{[0,1)^{s_2}} f(x, y) dy dx = \lim_{n \to \infty} \frac{1}{n} \sum_{i=0}^{n-1} \frac{1}{b^m} \sum_{k=0}^{b^m-1} f(x_i, y_{b^m \lfloor i/b^m \rfloor + k})$$

in consistent.
Proof. Swapping the two sums in the algorithm yields $$\lim_{n \to \infty} \frac{1}{n} \sum_{i=0}^{n-1} \frac{1}{b^m} \sum_{k=0}^{b^m-1} f(x_i, y_{b^m \lfloor i/b^m \rfloor + k}) =$$

$$\frac{1}{b^m} \sum_{k=0}^{b^m-1} \underbrace{\lim_{n \to \infty} \frac{1}{n} \sum_{i=0}^{n-1} f(x_i, y_{b^m \lfloor i/b^m \rfloor + (i+k) \mod b^m})}_{(*)}$$

For fixed $k \in \{0, \ldots, b^m-1\}$, looking at the term (*), the j-th component $$y_{b^m \lfloor i/b^m \rfloor + (i+k) \mod b^m}^{(j)} = (b^{-1} \ldots b^{-M}) C^{(j)} \begin{pmatrix} a_0((i+k) \mod b^m) \\ \vdots \\ a_{m-1}((i+k) \mod b^m) \\ a_m(i) \\ \vdots \end{pmatrix} =$$

$$(b^{-1} \ldots b^{-M}) C^{(j)} \begin{pmatrix} \pi_k(a_0(i)) \\ \vdots \\ \pi_{k,a_0,\ldots,a_{m-2}}(a_{m-1}(i)) \\ a_m(i) \\ \vdots \end{pmatrix}$$

of $y_{b^m \lfloor i/b^m \rfloor + (i+k) \mod b^m}$ is rewritten by inserting the index $b^m \lfloor i/b^m \rfloor + (i+k) \mod b^m$ into the definition of the radical inverse.

Additionally, a first step of the transformation may reveal that only the m least significant digits of i are changed by the enumeration scheme. Consequently, the permutation (i+k) mod $b^m$ may only affect the m most significant digits of the j-th component, because by assumption the generator matrix $C^{(j)}$ may be a regular, upper triangular matrix. The second step rewrites the extraction of a digit from the permutation (i+k) mod $b^m$ as a permutation applied to a digit of i, where the permutation may depend on k and the previous least significant digits.

Further, changing the enumeration order of the partial sequence $y_i$ may result in the same points. However, the above derivation shows that this reordering can be understood as a scrambling, which is permuting elementary intervals. Hence, the sequence $(x_i, y_b m_{\lfloor i/b \rfloor m_{l+(i+k) \mod b}} m)$ remains a (t,s)-sequence with an identical parameter that may result from applying a partial deterministic scrambling to the original (t,s)-sequence $(x_i, y_i)$.

Figure 5:
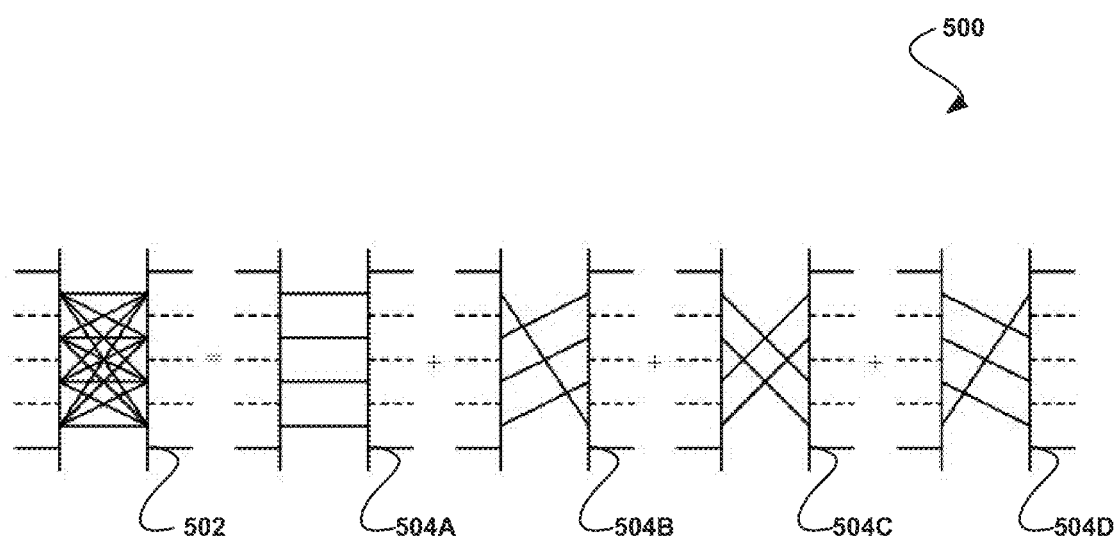
FIG. 5 shows an exemplary block equivalence, in accordance with another embodiment.

In combination with the assumption of a square integrable, bounded integrand, convergence to the desired integral may be guaranteed. Averaging the results of term (*) for all k yields the consistency of the measurement contribution algorithm, which concludes the proof. Also, FIG. 5 illustrates an exemplary equivalence 500 between the combination of all vectors $x_i$ and $y_i$ within a block 502 and the sum of all tuples 504A-D within the block.

As a corollary, the result extends to quasi-Mont Carlo integro-approximation. In the aforementioned references it has been shown that quasi-Monte Carlo integration and integro-approximation may converge for bounded, square integrable functions, which is the setting in computer graphics. However, the error bounds do not provide a separation into a property of the function $f$ and a rate of convergence depending on the number n of samples. In order to argue for the superiority of quasi-Monte Carlo methods over Monte Carlo methods, rates provided by theorems on discrete density approximation can be consulted. See, for example, "Über eine Transformation von gleichverteilten Folgen II" (E. Hlawka et al., *Computing*, 1972, 9(2):127-138), which is hereby incorporated by reference in its entirety.

Whenever the functions are more specific functions classes, like for example in the class of bounded variation in the sense of Hardy and Krause, the discrepancy of the point set provides a convergence rate, like for example the Koksma-Hlawka inequality. In conclusion, one can always argue for a superiority of deterministic low discrepancy sampling over (pseudo-) random sampling. While in some settings the advantage may be small, the deterministic method may be simpler to parallelize and reproduce.

Additionally, in one embodiment, Rank-1 lattice sequences may include point sequences resulting from multiplying a generator vector $g \in \mathbb{N}^s$ by a (0,1)-sequence base h on the unit torus. If now the base b is relatively prime to the components of the generator vector g, each component of the rank-1 lattice sequence may be a (0,1)-sequence. See, for example, "Extensible lattice sequences for quasi-Monte Carlo quadrature" (F. Hickernell et al., *SIAM J. Sci. Comput.*, 2001, 22:1117-4138), which is hereby incorporated by reference in its entirety.

While scrambling may destroy the lattice structure, it may not change the order of uniformity. For example, as only elementary intervals are permuted, low discrepancy rank-1 lattice sequences may remain of low discrepancy. Therefore, the measurement contribution algorithm may work with rank-1 lattice sequences for any block size $b^m$ in analogy to the theorem in Table 8.

Further, the theorem in Table 8 may require the components of $y_i$ to be (0,1)-sequences. While this is true for Halton type sequences, the bases for each dimension may be relatively prime, which may require the block size to be a product of powers of the bases in order to make the theorem in Table 8 work. Then the approach may become impractical, because the block size now exponentially grows with dimension. See, for example, "On the efficiency of certain quasi-random sequences of points in evaluating multi-dimensional integrals" (J. Halton, *Numerische Math.*, 1960, 2(1):84-90), which is hereby incorporated by reference in its entirety.

Further still, as shown in operation 206, the low discrepancy sequence is enumerated in contiguous blocks of segments having the block size. Also, as shown in operation 208, the measurement contribution function is evaluated for all possible pairs of segments of the low discrepancy sequence within each block. For example, the low discrepancy sequence $(x_i, y_i)$ may be enumerated in contiguous blocks of $b^m$ elements. Then, the function $f$ may be evaluated for all possible pairs $(x_i, y_b m_{\lfloor i/b \rfloor} m_{\lfloor i/b \rfloor + (i+k) \bmod b} m)$ of arguments within each block.

Also, in one embodiment, end points may be determined for each segment. For example, in a light transport simulation, each tuple $(x_i, y_i)$ may determine two end points $h(x_i)$ and $h(y_i)$ of path segments in space. While $h(y_i)$ may result from tracing the trajectory of a photon started on a light source, the $h(x_i)$ may result from following optical paths starting from the camera, eye, etc. In analogy to a random walk simulation, decisions of how to scatter and/or terminate paths may be controlled by the components of the low discrepancy points $(x_i, y_i)$ instead of using random numbers.

Figure 6:
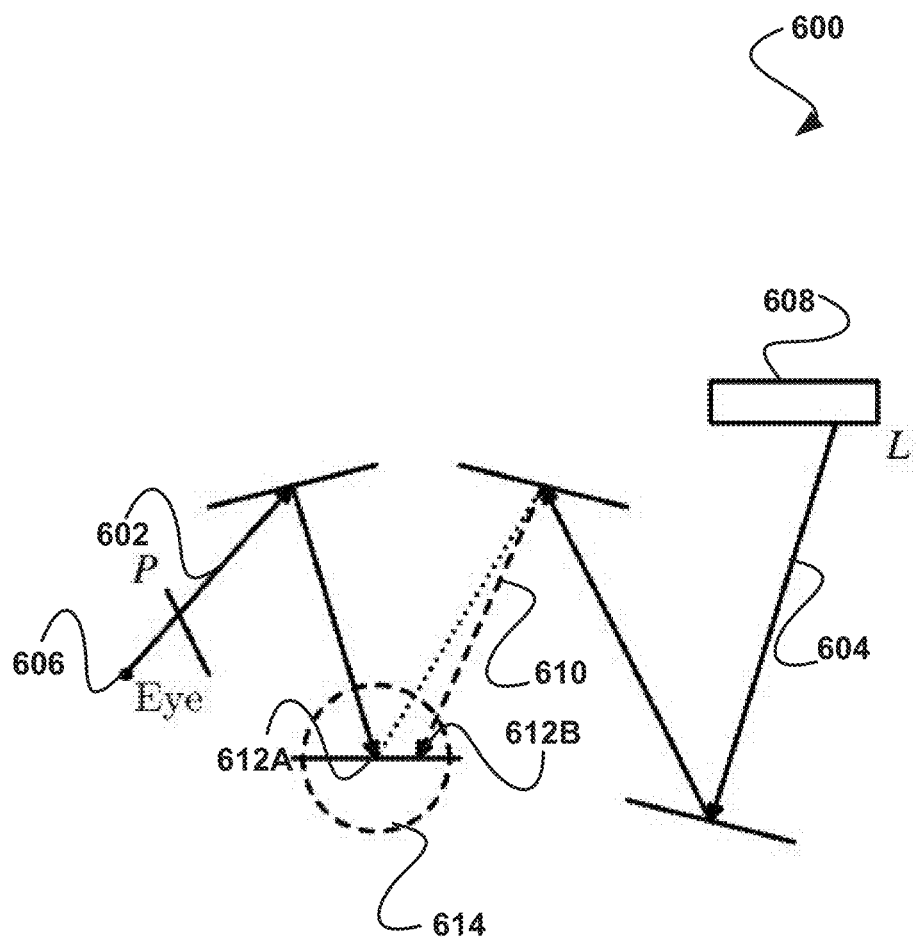
FIG. 6 shows an exemplary bidirectional generation of light transport paths for use in segment connection, in accordance with another embodiment.

In addition, in one embodiment, the segments may be connected. For example, in order to determine the measurement contribution $f$, the path segments generated this way may be connected by testing their mutual visibility or connecting end points of path segments that are sufficiently close. FIG. 6 illustrates an exemplary bidirectional generation of light transport paths 600 for use in segment connection. As shown, a path segment 602 started from the eye 606 and a path segment 604 started from a light source 608 are connected by a shadow ray 610 as indicated by the dotted line, which checks whether the vertices to connect 612A and C are mutually visible. Additionally, photon mapping may be used to relax the precise visibility check by allowing for a connection of both path segments 602 and 604 if their end points 612A and B are sufficiently close as indicated by the dashed circle 614 centered in the point 612A. For the purpose of illustrating both connection techniques for the same path length, the path segment 604 has been extended by the dashed ray in FIG. 6.

Furthermore, in one embodiment, segments may be connected utilizing consistent bidirectional path tracing. For example, a Monte Carlo method may first generate a set of paths from an eye into the scene, and may then trace paths of photons from light sources yielding a set of virtual point lights, and may finally check a visibility of each point light source from each end point of the eye paths in order to compute the radiance passing through the screen's pixels. Convergence may be achieved by iterating the procedure. See, for example, "Combinatorial bidirectional path-tracing for efficient hybrid CPU/GPU rendering" (A. Pajot et al., *Computer Graphics Forum*, 2011, 30(2):315-324), which is hereby incorporated by reference in its entirety.

Further still, the measurement contribution algorithm shown in Table 1 may include the deterministic and consistent quasi-Monte Carlo analog of the above procedure. For example, for m=0, the method may coincide with bidirectional path tracing, where each camera path segment is connected with its photon path segment. While for m=0 the dominating transient artifact may be noise, for m>0 larger block sizes trade noise for coherence artifacts (e.g., discrete shadow boundaries, etc.). See, for example, "Robust Monte Carlo Methods for Light Transport Simulation" (E. Veach, *PhD thesis, Stanfbal University*, 1997), and "Optimally combining sampling techniques for Monte Carlo rendering" (E. Veach et al., *Proc. SIGGRAPH* 1995, 1995, pages 419-428), which are hereby incorporated by reference in their entirety. Also, see, for example, "Mathematical Models and Monte Carlo Algorithms for Physically Based Rendering" (E. Lafortune, *PhD thesis, Katholieke Universitiet Leuven, Belgium*, 1996), and "Instant radiosity" (A. Keller, *SIGGRAPH 1997: Proc. 24th Annual Conference on Computer Graphics and Interactive Techniques*, 1997, pages 49-56), which are hereby incorporated by reference in their entirety.

Also, in one embodiment, segments may be connected utilizing consistent photon mapping. For example, as background, connecting light path segments by checking the mutual visibility of their end points may not be the most efficient in some situations. In such situations, connecting path segments if their end points are sufficiently close, i.e. if their difference vector lies within a ball B of radius r(n) centered at the origin, may be used. See, for example, "Efficient bidirectional path tracing by randomized quasi-Monte Carlo integration" (T. Kollig et al., *Monte Carlo and Quasi-Monte Carlo Methods* 2000, 2002, pages 290-305), which is hereby incorporated by reference in its entirety.

Additionally, $\chi_{B(r(n))}$ using as the characteristic function of that ball, the radiance may be determined by averaging the contributions to a query location $h(x_i)$ attenuated by the throughput $W(x_i)$ of the path, where $\chi_P$ selects the paths contributing to the pixel P. These contributions may include the product of the flux $\phi$ of a photon attenuated by the bidirectional scattering distribution function (BRDF) $f_s$ averaged over the disk with the radius r(n). The BRDF may determine the fraction of light incident from direction $\omega(y_b m_{\lfloor i/bm \rfloor + k})$ in the surface location $h(x_i)$ into direction $\omega(x_i)$, where the directions are determined by the respective last edge of the path segments.

Table 9 illustrates an exemplary radiance calculation. Of course, it should be noted that the radiance calculation in Table 9 is set forth for illustrative purposes only, and thus should not be construed as limiting in any manner.

TABLE 9

$$L_P = \lim_{n \to \infty} \frac{|P|}{n} \sum_{i=0}^{n-1} \chi_P(x_i) W(x_i) \frac{1}{b^m} \sum_{k=0}^{b^m-1} \frac{\chi_{B(r(n))}(h(x_i) - h(y_b m_{\lfloor i/b^m \rfloor + k}))}{\pi r^2(n)} \cdot$$
$$f_s(\omega(x_i), h(x_i), \omega(y_b m_{\lfloor i/b^m \rfloor + k})) \phi(y_b m_{\lfloor i/b^m \rfloor + k})$$

Further, in one embodiment, the characteristic function $\chi_{B(r)}$ may select a subset of path space. Since light transport is a linear problem, the number of paths in that set asymptotically may be linear in n. Table 10 illustrates an exemplary radius calculation. Of course, it should be noted that the radius calculation in Table 10 is set forth for illustrative purposes only, and thus should not be construed as limiting in any manner.

TABLE 10

$$r^2(n) = \frac{r_0^2}{n^\alpha}$$

Further still, if now the radius for some fixed $r_0 \in R^+$, consistency may be proved. For example, for $\alpha=1$, doubling the number n of paths may result in half the squared radius, meaning half the area, while the number of paths connected in $B(r(n))$ may remain the same due to linearity. For $0<\alpha<1$ the squared radius may decrease slower than the increase in number of connected paths. As a consequence, more and more paths may become connected with increasing n, which may guarantee convergence. For instance, for $\alpha=0$ the radius r may become independent of n and the computation may converge to an average over the disk of fixed radius r, because no term depends on n any longer.

Also, in the practical computation of the radiance as shown in Table 9, for each block its smallest radius may be used, which may be $r(b^m([i/b^m]+1)-1)$. If the number of blocks is finite and known beforehand, the overall smallest radius may be used right from the beginning.

Additionally, in one embodiment, the radius may vanish arbitrarily slowly and the influence of the parameter a may become negligible already after enumerating a few blocks. Consequently, the efficiency may be controlled by the initial radius $r_0$ and the parameter in determining the block size $b^m$. The initial radius $r_0$ may determine the ratio of how many photons can interact with a query location. Besides choosing $r_0$ constant, adaptive methods may be used. See, for example, "Progressive photon mapping: A probabilistic approach" (C. Knaus et al., *ACM Transactions on Graphics (TOG)*, 2011, 30(3)), which is hereby incorporated by reference in its entirety.

Furthermore, in one embodiment, participating media may be considered while connecting segments. For example, the computation of the radiance as shown in Table 9 may be extended for light transport simulation in participating media. For instance, the BRDF may be replaced by the product of phase function and scattering cross section, while for example Woodcock tracking may be used to sample path segments in participating media. See, for example, "Progressive photon beams" (W. Jarosz et al., *AGM Transactions on Graphics (Proceedings of ACM SIGGRAPH Asia* 2011), December 2011, 30(6)), which is hereby incorporated by reference in its entirety.

Table 11 illustrates an exemplary bidirectional surface scattering reflectance distribution function (BSSRDF). Of course, it should be noted that the BSSRDF in Table 11 is set forth for illustrative purposes only, and thus should not be construed as limiting in any manner.

TABLE 11

$f_s(\omega(x_i), h(x_i), h(y_{b^m[i/b^m]+k}), \omega(y_{b^m[i/b^m]+k}))$

In one embodiment, the concept of the BSSRDF may extend the BRDF by a second point of interaction and may return the fraction of subsurface scattering from the second to the first location. The BSSRDF thus may be used as a density estimation kernel to replace the product of the BRDF and the computation of the radiance as shown in Table 9 in order to simulate subsurface scattering. See, for example, "A practical model for subsurface light transport" (H. Jensen et al., *Proceedings of SIGGRAPH '01*, 2001, pages 511-518), and "Density Estimation for Statistics and Data Analysis" (B. Silverman, *Chapman & Hall/CRC,* 1986), which are hereby incorporated by reference in its entirety.

Additionally, in one embodiment, the hit point $h(y_i)$ may be used instead of $h(x_i)$ in the BRDF. Furthermore it may be possible to have the radius $r^2(x_i, y_{bm[i/b}m]_{+k}, n)$ depend on both hit points to be connected. In another embodiment, with respect to efficiency, the computation of the radiance as shown in Table 9 may be extended by a sum to account for multiple photons and/or query locations stored along path segments. Then bounding memory in a conservative way may result in a memory footprint proportional to the block size multiplied by the maximum path length. Therefore, it may be more efficient to fix an in, which may be decreased during the course of computation whenever the allocated memory block cannot store all path segments. Further, in the limit this adaptive procedure converges as well. Alternatively, a Russian roulette technique may be used to control the amount of query locations and photons to be stored.

Further, in one embodiment, the block size dictating the size of the contiguous blocks of segments may be adjusted. For example, for consistent photon mapping, a larger block size may increase a density of query locations and photons, which in turn may result in more paths being connected. Since the memory footprint may be proportional to the block size, m may be determined by a maximum amount of memory dedicated to storing query locations and photons. In another embodiment, in the limit an infinite block size may result in having each query location interact with each photon similar to the idea of a tensor product approach.

Further still, in one embodiment, with respect to path tracing, in may blend between different algorithmic concepts. For example, the $x_i$ may be used to generate paths uniformly sampling the screen. If now $b^m$ is about the number of pixels, each path through a pixel may be connected to $b^m$ paths from light sources. This approach may resemble methods of dependent tests but now the scheme may be deterministic and consistent. In another embodiment, the application of smaller block sizes may result in a consistent version of interleaved sampling, where neighboring pixels may not share light path samples. See, for example, "Interleaved sampling" (A. Keller et al., *Rendering Techniques* 2001 (*Proc. 12th Eurographics Workshop on Rendering*), 2001, pages 269-276), which is hereby incorporated by reference in its entirety.

Also, in one embodiment, although bidirectional path tracing and photon mapping (i.e. integration and density estimation, etc.) may impose different constraints on in, both approaches may be efficiently combined. For example, the $b^m$ samples in a block used for density estimation may be partitioned into smaller blocks of the size of a power of b for integration purposes.

In addition, in one embodiment, by using multiple importance sampling, it may be possible to further increase efficiency by weighting the contributions of both bidirectional path tracing and photon mapping. Further, compared to the tensor product quasi-Monte Carlo method, the current measurement contribution function may be consistent without having to compute identical paths over and over again and thus may sample path space more densely in the same amount of time. See, for example, "*Unbiased physically based rendering on the GPU*" (D. van Antwerpen, *Master's thesis, Computer Graphics Research Group, Department of Software Technology Faculty EEMCS, Delft University of Technology, the Netherlands,* 2011, pages 511-518), and "A comparison of light transport algorithms OD the GPU" (K. Dahm, *Master's thesis, Computer Graphics Group, Saarland University, Germany,* 2011), which are hereby incorporated by reference in its entirety.

In another embodiment, the measurement contribution function may complement controlling the ratio of eye and photon paths using an orthogonal technique of enumerating low discrepancy sequences, whose components are (0,1)-sequences, at different speeds. See, for example, MI-11-0097-ISF, which is hereby incorporated by reference in its entirety.

Figure 7:
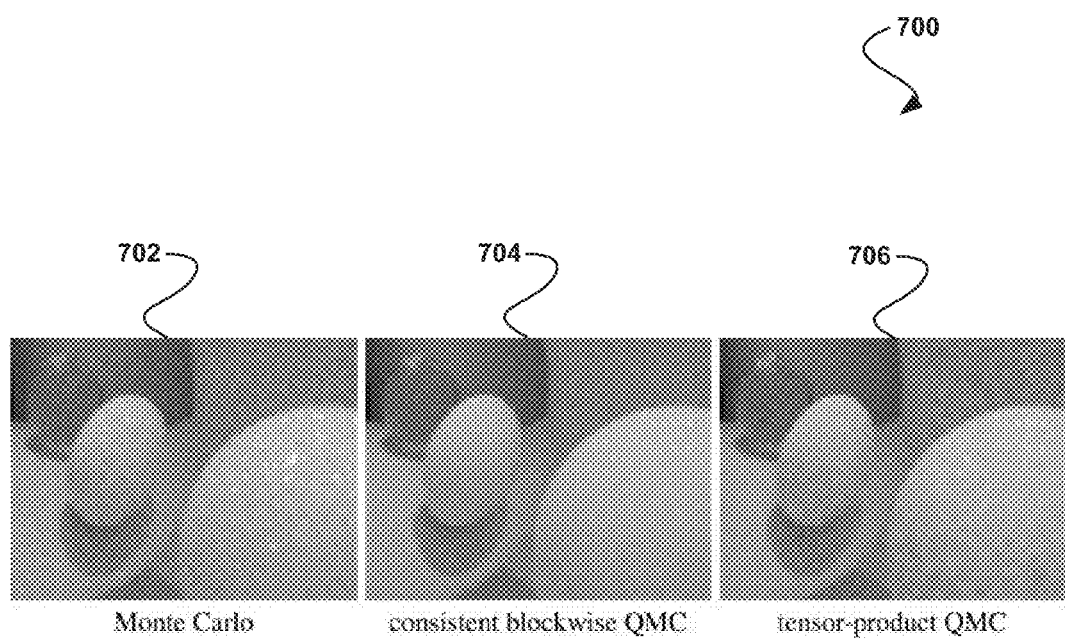
FIG. 7 shows exemplary image results utilizing different approaches to sampling, in accordance with another embodiment.

FIG. 7 shows exemplary image results 700 utilizing different approaches to sampling. As shown, the results 700 are associated with three approaches to sampling in light transport simulation computed at an identical number of samples. Additionally, the image quality achieved by consistent blockwise quasi-Monte Carlo method results 704 may be more realistic and smoother when compared to both the tensor product approach results 706 and the Monte Carlo method results 702. In one embodiment, the quasi-Monte Carlo methods may use a Sobol' sequence, and the pseudorandom numbers may be generated using the Mersenne Twister.

Figure 8:
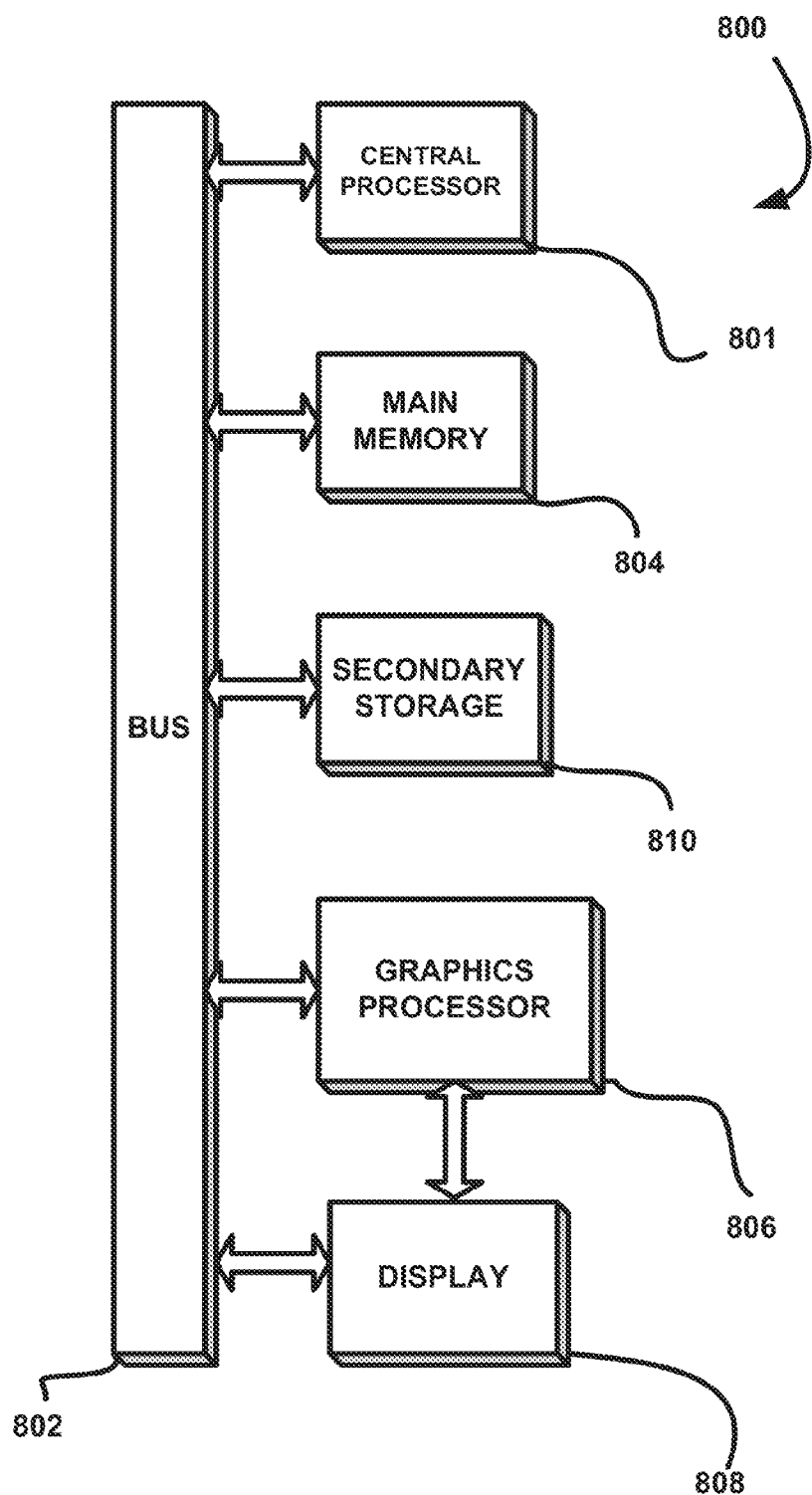
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (CPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, and/or any other type of logic. Still yet, the system 800 may take the form of various other devices m including, but not limited to a personal digital assistant (PDA) device, a mobile phone device, a television, etc.

Further, while not shown, the system 800 may be coupled to a network [e.g. telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining a sequence of vectors that includes a plurality of vectors;
   determining a block size;
   partitioning the sequence of vectors into a plurality of contiguous blocks of vectors, wherein each contiguous block of vectors has a size equal to the block size; and
   evaluating an integral using a processor, utilizing the contiguous blocks of vectors.

2. The method of claim 1, wherein the sequence of vectors includes a sequence of tuples, $(x_i, y_i)$, where $x_i$ represents dimensions of a sink path segment, and $y_i$ represents dimensions of a source path segment.

3. The method of claim 1, wherein the sequence of vectors includes a (t,s)-sequence in base b.

4. The method of claim 1, wherein the sequence of vectors includes a rank-1 lattice sequence.

5. The method of claim 1, wherein the sequence of vectors includes a Halton sequence.

6. The method of claim 1, wherein the block size includes a predetermined number of vectors to be contained within a block of vectors.

7. The method of claim 1, wherein the integral includes an integral of a measurement contribution function $f(x,y)$.

8. The method of claim 1, wherein the integral an integral of a measurement contribution function $f(x_i, y_i)$, where the measurement contribution function is evaluated for all tuples $(x_i, y_i)$ within each contiguous block of vectors.

9. The method of claim 1, wherein evaluating the integral includes utilizing a consistent blockwise quasi-Monte Carlo method to generate one or more paths by connecting path segments for a light transport simulation.

10. The method of claim 7, wherein the measurement contribution function $f(x,y)$ determines a light transport measurement along a light transport path.

11. The method of claim 8, wherein end points are determined for each tuple $(x_i, y_i)$.

12. The method of claim 11, wherein the end points are connected utilizing a kernel function.

13. The method of claim 12, wherein the kernel function includes one or more of a shadow ray test, a connection by proximity, and a bidirectional surface scattering reflectance distribution function.

14. A non-transitory computer readable medium encoded with a computer program, comprising:
   code for determining a sequence of vectors that includes a plurality of vectors;
   code for determining a block size;
   code for partitioning the sequence of vectors into a plurality of contiguous blocks of vectors, wherein each contiguous block of vectors has a size equal to the block size; and
   code for evaluating an integral, utilizing the contiguous blocks of vectors.

15. A system, comprising:
a processor configured to:
- determine a sequence of vectors that includes a plurality of vectors;
- determine a block size;
- partition the sequence of vectors into a plurality of contiguous blocks of vectors, wherein each contiguous block of vectors has a size equal to the block size; and
- evaluate an integral, utilizing the contiguous blocks of vectors.

16. The system of claim 15, wherein the system is implemented on a reconfigurable device.

17. The system of claim 16, wherein the reconfigurable device includes a field-programmable gate array (FPGA).

* * * * *